US007222407B2

(12) United States Patent
Sayar

(10) Patent No.: US 7,222,407 B2
(45) Date of Patent: May 29, 2007

(54) METHODS OF MAKING FLUIDIC FLOW CONTROLLER ORIFICE DISC FOR FUEL INJECTOR

(75) Inventor: Hamid Sayar, Newport News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 109 days.

(21) Appl. No.: 10/972,583

(22) Filed: Oct. 26, 2004

(65) Prior Publication Data

US 2005/0121543 A1 Jun. 9, 2005

Related U.S. Application Data

(60) Provisional application No. 60/514,779, filed on Oct. 27, 2003.

(51) Int. Cl.
*B23P 13/04* (2006.01)

(52) U.S. Cl. ........................................... 29/558; 29/557

(58) Field of Classification Search .................. 29/558, 29/557; 239/533.12, 502, 522, 596, 533.14
See application file for complete search history.

(56) References Cited

U.S. PATENT DOCUMENTS 1,693,931 A 12/1928 Lowe
2,493,209 A 1/1950 Simmons
4,040,396 A 8/1977 Tomita
5,586,726 A 12/1996 Furuya et al.
6,065,691 A 5/2000 West
6,065,692 A 5/2000 Brinn, Jr.
6,102,299 A 8/2000 Pace et al.
6,161,782 A 12/2000 Heinbuck et al.
6,357,677 B1 3/2002 Ren et al.
6,550,696 B2 * 4/2003 Mansour et al. ............ 239/399
6,848,635 B2 * 2/2005 Xu ........................ 239/533.12
2003/0234302 A1 12/2003 Varble et al.

* cited by examiner

*Primary Examiner*—John Hong

(57) ABSTRACT

A method of making a metering orifice disc from a work piece is disclosed. The work piece has a first surface spaced apart from a second surface over a first distance. The metering orifice disc has an outer diameter from 4 to 6 millimeters with at least one orifice disposed through the metering disc of about 75 to 150 microns in effective diameter. The method can be achieved by removing material from one of the first and second surfaces of the work piece to define a recessed surface between first and second walls, the recessed surface being located between the first and second surfaces of the work piece; and forming an orifice in the recessed surface proximate a shortest distance between the first and second walls to define two channels that extend towards the longitudinal axis, the orifice extends through the recessed surface to one of the first and second surfaces. A method of making a valve seat is also described.

13 Claims, 6 Drawing Sheets

FIG. 3A
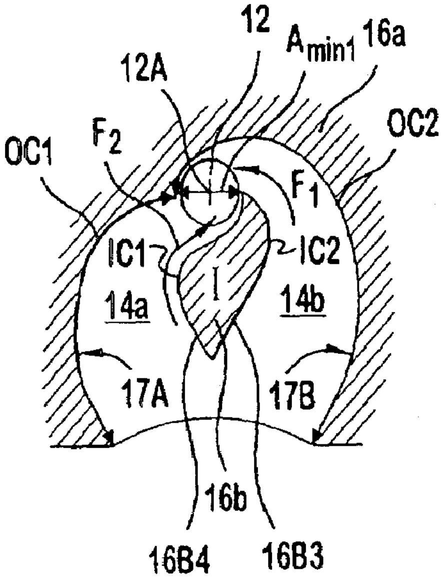
FIG. 3B
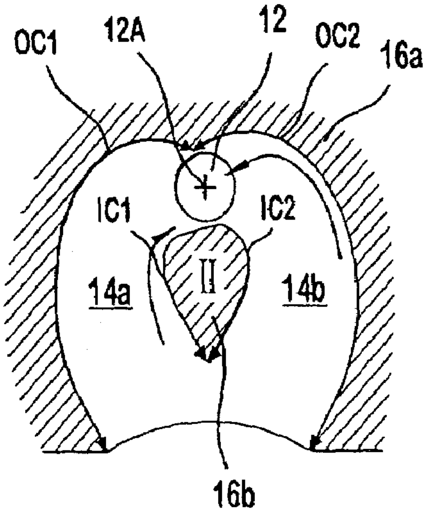
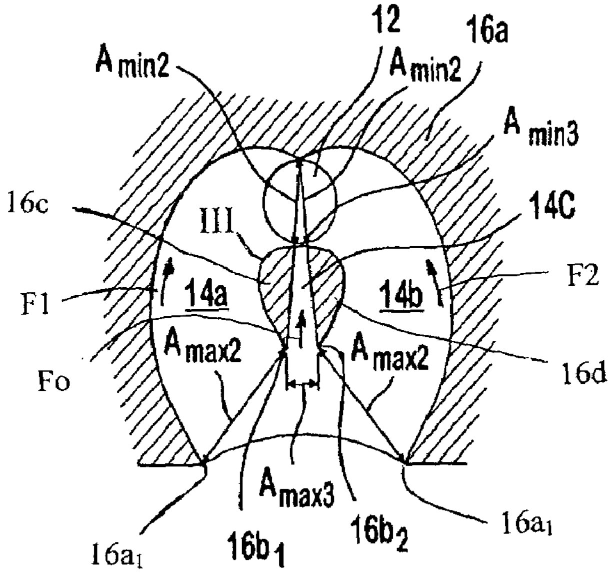
FIG. 3C

METHODS OF MAKING FLUIDIC FLOW CONTROLLER ORIFICE DISC FOR FUEL INJECTOR

This application claims the benefits of U.S. provisional patent application Ser. No. 60/514,779 entitled “Fluidic Flow Controller Orifice Disc,” filed on 27 Oct. 2003, which provisional patent application is incorporated herein by reference in its entirety into this application.

BACKGROUND OF THE INVENTION

Most modern automotive fuel systems utilize fuel injectors to provide precise metering of fuel for introduction into each combustion chamber. Additionally, the fuel injector atomizes the fuel during injection, breaking the fuel into a large number of very small particles, increasing the surface area of the fuel being injected, and allowing the oxidizer, typically ambient air, to more thoroughly mix with the fuel prior to combustion. The metering and atomization of the fuel reduces combustion emissions and increases the fuel efficiency of the engine. Thus, as a general rule, the greater the precision in metering and targeting of the fuel and the greater the atomization of the fuel, the lower the emissions with greater fuel efficiency.

An electromagnetic fuel injector typically utilizes a solenoid assembly to supply an actuating force to a fuel metering assembly. Typically, the fuel metering assembly is a plunger-style closure member which reciprocates between a closed position, where the closure member is seated in a seat to prevent fuel from escaping through a metering orifice into the combustion chamber, and an open position, where the closure member is lifted from the seat, allowing fuel to discharge through the metering orifice for introduction into the combustion chamber.

The fuel injector is typically mounted upstream of the intake valve in the intake manifold or proximate a cylinder head. As the intake valve opens on an intake port of the cylinder, fuel is sprayed towards the intake port. In one situation, it may be desirable to target the fuel spray at the intake valve head or stem while in another situation, it may be desirable to target the fuel spray at the intake port instead of at the intake valve. In both situations, the targeting of the fuel spray can be affected by the spray or cone pattern. Where the cone pattern has a large divergent cone shape, the fuel sprayed may impact on a surface of the intake port rather than towards its intended target. Conversely, where the cone pattern has a narrow divergence, the fuel may not atomize and may even recombine into a liquid stream. In either case, incomplete combustion may result, leading to an increase in undesirable exhaust emissions.

Complicating the requirements for targeting and spray pattern is cylinder head configuration, intake geometry and intake port specific to each engine’s design. As a result, a fuel injector designed for a specified cone pattern and targeting of the fuel spray may work extremely well in one type of engine configuration but may present emissions and driveability issues upon installation in a different type of engine configuration. Additionally, as more and more vehicles are produced using various configurations of engines (for example: inline-4, inline-6, V-6, V-8, V-12, W-8 etc.,), emission standards have become stricter, leading to tighter metering, spray targeting and spray or cone pattern requirements of the fuel injector for each engine configuration. Thus, it is believed that there is a need in the art for a fuel injector that would alleviate the drawbacks of the conventional fuel injector in providing spray targeting and atomizing of fuel flow with minimal modification of a fuel injector.

SUMMARY OF THE INVENTION

The present invention provides a method of making a metering orifice disc from a work piece. The work piece has a first surface spaced apart from a second surface over a first distance. The metering orifice disc has an outer diameter from 4 to 6 millimeters with at least one orifice disposed through the metering disc of about 75 to 150 microns in effective diameter. The method can be achieved by removing material from one of the first and second surfaces of the work piece to define a recessed surface between first and second walls, the recessed surface being located between the first and second surfaces of the work piece; and forming an orifice in the recessed surface proximate a shortest distance between the first and second walls to define two channels that extend towards the longitudinal axis, the orifice extends through the recessed surface to one of the first and second surfaces. The method can also include: generating a two-dimensional image that defines recessed surfaces on a transfer medium; applying a photographically resistant masking film onto one of the first and second surfaces; transferring the image to the photographically resistant masking film disposed on the one surface; and dissolving portions of the work piece having the image of the recessed surface area on the work piece to define the recessed surface between the wall structures.

In yet another aspect of the present invention, a method of making a valve seat from a work piece is provided. The work piece includes a first surface spaced apart from a second surface over a first distance. The method can be achieved by providing a seat orifice extending through the seat from the first surface along a longitudinal axis extending through the seat orifice to the second surface of the work piece; and removing material on the second surface of the work piece to define at least two flow channels extending generally transversely with respect to the longitudinal axis between first and second walls.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIGS. 3A, 3B and 3C illustrate various configurations of the flow channels for the metering orifice discs of FIG. 2A.

DETAILED DESCRIPTION OF THE PREFERRED EMBODIMENTS

Figure 1:
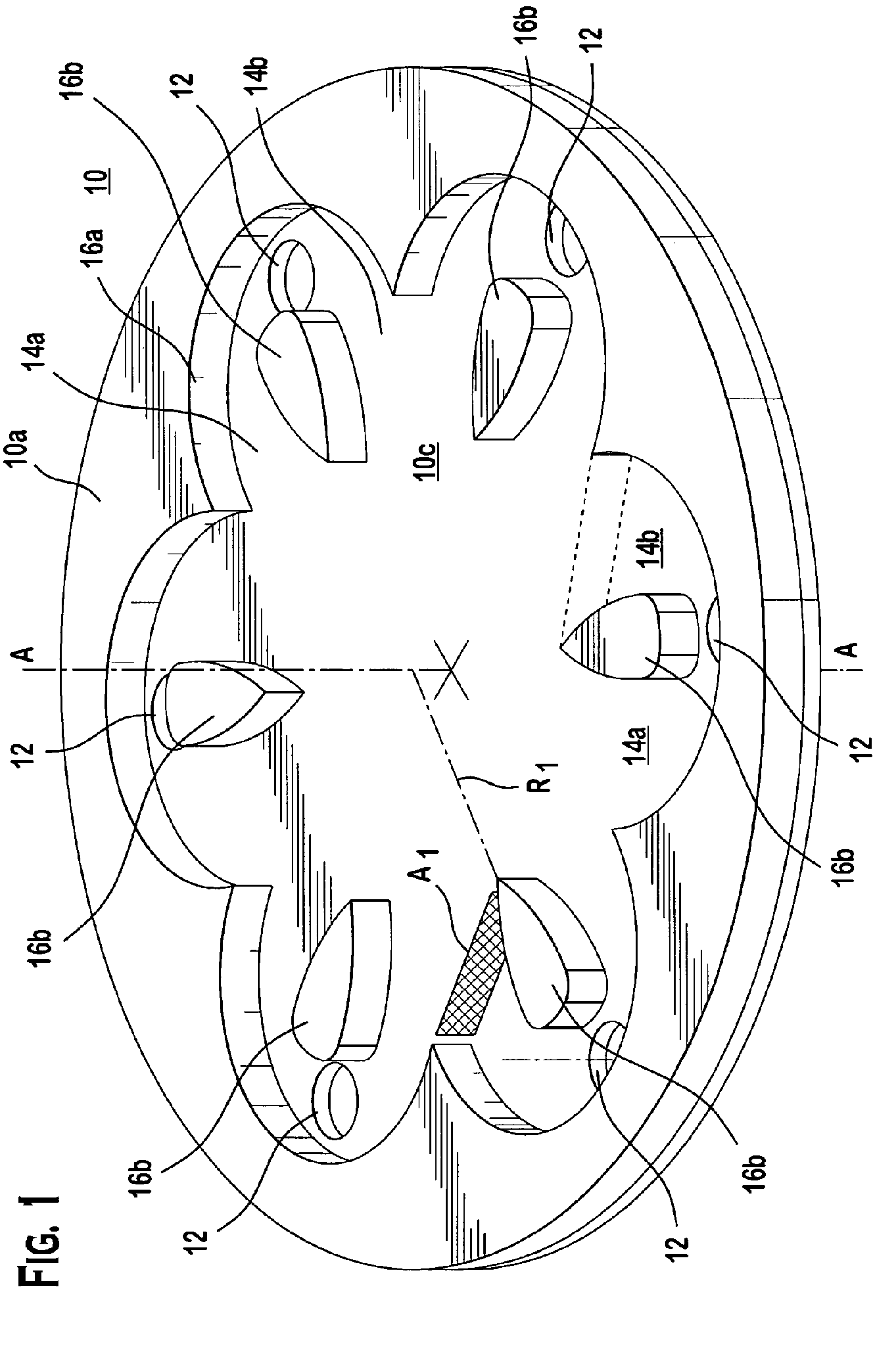
FIG. 1 illustrates a perspective view of a preferred embodiment of a metering orifice disc for use in a fuel injector.

FIGS. 1–6 illustrate the preferred embodiments. Referring to FIG. 1, a perspective view of a preferred metering orifice disc 10 that can be made by the preferred process described herein is illustrated. The metering orifice disc 10 includes a first metering disk surface 10*a* and an oppositely facing second metering disk surface 10*b*. A longitudinal axis A—A extends through both surfaces 10*a* and 10*b* of the metering orifice disc 10. A plurality of through openings or metering orifices 12 is formed through the metering orifice disc 10 on a recessed third surface 10*c*. The metering orifices 12 are preferably located radially outward of the longitudinal axis and extend through the metering orifice disc 10 along the longitudinal axis so that the internal wall surface of the metering orifice defines a center 12*a* of the through-opening 12. Although the metering orifices 12 are illustrated preferably as having the same configuration, other configurations are possible such as, for example, a non-circular flow opening with different sizes of the flow opening between one or more metering orifices.

The metering orifice disc 10 includes two flow channels 14*a* and 14*b* provided by two walls 16*a* and 16*b*. A first wall 16*a* surrounds the metering orifices 12. A second wall 16*b*, acting as a flow divider, is disposed between each metering orifice and the longitudinal axis. The first wall 16*a* surrounds at least one metering orifice and at least the second wall 16*b*. The second wall 16*b* is preferably in the form of a teardrop shape but can be any suitable shape as long as the second wall 16*b* divides a fuel flow proximate the longitudinal axis A—A into two flow channels 14*a* and 14*b* and recombine the fuel flow proximate the through-opening 12 at a higher velocity than as compared to the velocity of the fuel at the beginning of the second wall 16*b*.

The metering orifice disc 10 can be made by any suitable technique and preferably by at least two techniques. The first technique utilizes laser machining to selectively remove materials on the surface of the metering orifice disc 10. The second technique utilizes chemical etching to dissolve portions of the metallic surface of the metering orifice disc 10.

In the first technique, a laser light source, such as a frequency doubled Neodymium: Yttrium-Aluminum-Garnet (Nd: YAG) laser with a suitable wavelength is used to ablate the surface of the metering orifice disc 10 in order to form the flow channel and drill the metering orifices 12. The laser can be pulsed so that its laser beam can vaporize the surfaces of the metering disc 10 as the laser scans across the first surface 10*a*. The laser wavelength can be from 190–350 nanometer with fluence in (Joules per centimeter squared) from 5 to greater than 20 $J/m^2$. The depth of material being removed (i.e., "etch depth") per pulse can be from 0.1 to greater than 0.25 microns per pulse. The metering orifices can be laser drilled according a technique shown and described in U.S. Pat. No. 6,600,132 granted on Jul. 29, 2003, which is incorporated by reference in its entirety into this application.

Figure 2A:
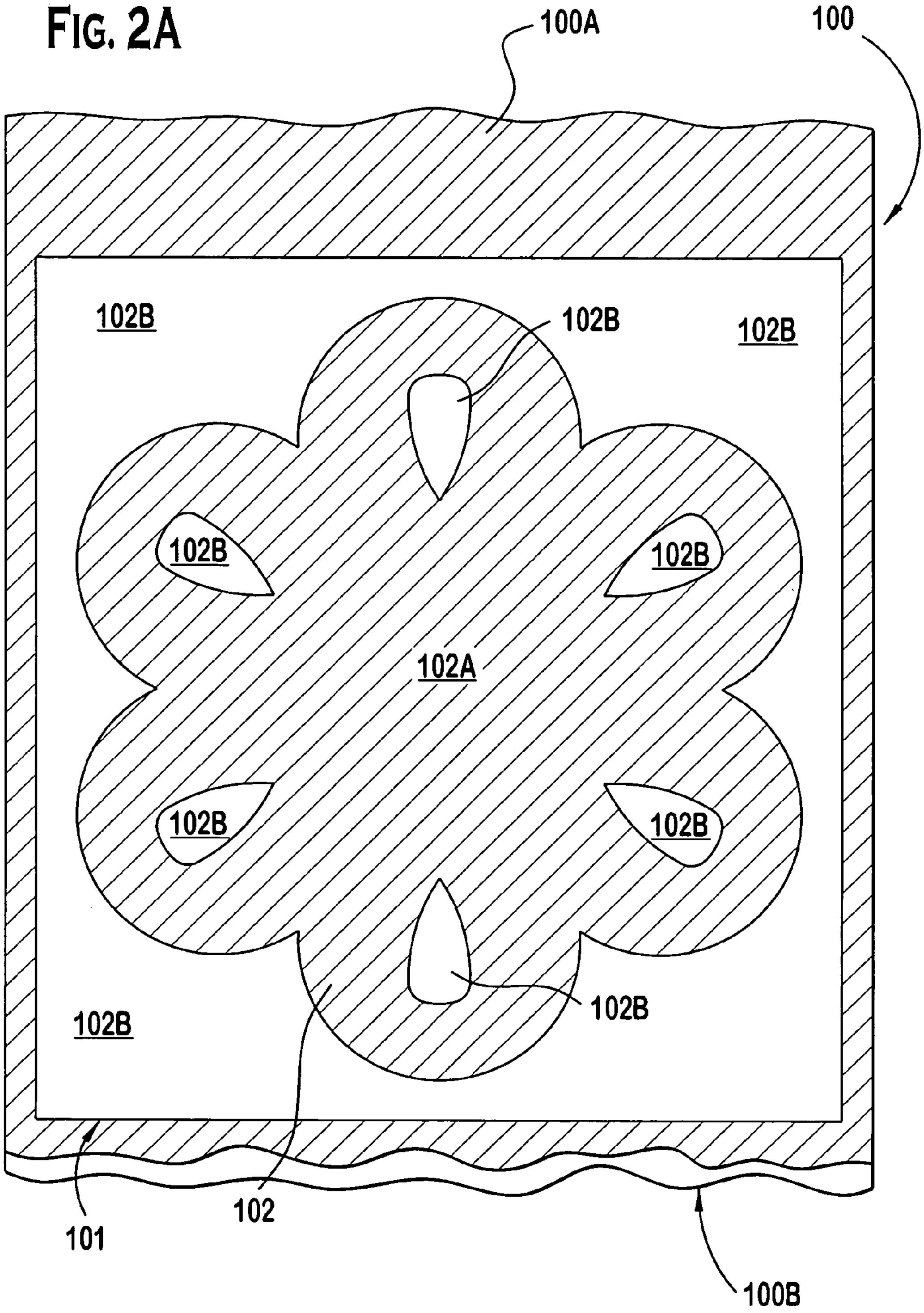
FIG. 2A illustrates a mask overlay disposed on a photographic resist film layer bonded to a surface of a work piece.

In the second technique, a generally planar work piece 100 is cleaned. The work piece 100, shown exemplarily here as a generally rectangular strip of stainless steel, includes a first surface 100A and a second surface 100B that faces in an opposite direction from the first surface 100A over a thickness of about 100–400 microns. One of the surfaces 100A and 100B of a work piece 100 can be coupled with a suitable photo sensitive material, such as, for example, a photopolymer, photosensitive lacquer, or preferably a photographic resistant film material (e.g., DuPont® Riston™ 4615 photoresist). In the preferred embodiment, a negative photo resist film 101 is adhered to the surface 100A. A photographic negative overlay 102 can be coupled to the photo resist film 101, which is on the surface 100A of the work piece 100, and both the film 101 and overlay 102 are exposed to an ultraviolet light ("UV") at a suitable wavelength (e.g., 140–900 nanometers). The overlay 102 includes covered area 102A so that the underlying film 101 is not exposed to UV light. The overlay includes uncovered areas 102B so that the underlying film 101 is exposed to UV light. After exposure to UV light, the work piece 100 and the photoresist film 101 is developed in a suitable developing solution (e.g., sodium hydroxide). After development of the film 101, areas 102A of the photoresist film 101 that has not been exposed to UV light will dissolve in the presence of a suitable chemical such as, for example, hydrofluoric, hydrochloric or nitric acid. For example, the cloverleaf shaped area of FIG. 2 is not exposed to UV light as denoted by the dashed lines such that, in the presence of acids, the surface 100A of the work piece will dissolve into a recessed surface 10C of the disc 10. Similarly, after development of the film 101, areas 102B of the photoresist film 101 that has been exposed to UV light would harden after development by a suitable chemical, i.e., become generally impervious to acids or other chemicals. For example, the teardrop shaped areas exposed areas 102B in FIG. 2 denotes cutouts that would allow UV light to penetrate through to the underlying film 101. Consequently, the film 101 would harden after development by a suitable chemical. The exposed (and hardened) areas 102B of the film 101 therefore would remain generally in place on top of the surface 100A of the work piece 100 while the acids dissolve or etch the metals around the areas 102B. Although the technique is described in conjunction with a dry negative photoresist film, other photoresist films such as, for example, a wet negative photoresist film or a positive photoresist in wet or dry form can also be used. This technique is believed to advantageous and is preferred because there are no mechanical forces applied to the work piece, and the final product tends to be burr and stress-free. Moreover, other techniques can also be utilized such as, for example, UV type 3-D lithography, electroplating or electroforming can be used to deposit layers of metals such as nickels to form the flow channels described herein. An alternative etching process can be provided by Buckbee-Mears Europe GmbH, Micro Etched Components, at Müllheim, Germany for etching of the metering orifice disc.

After the channels are etched, the work piece 100 is cleaned for removal of the hardened film layer 101 and prepared for any other operations such as, for example, drilling of the metering orifices 12. The metering orifices 12 can be formed by the same techniques described above or by electro discharge ("EM") machining. By way of example, the work piece 100 can be flipped upside down so that the second surface 100B is exposed for laser machining, ED machining, or etching of the metering orifices 12 in accordance with the second technique described above. Thereafter, the work piece can be formed in various configurations such as, for example, a circular configuration for use in a fuel injector.

Figure 2B:
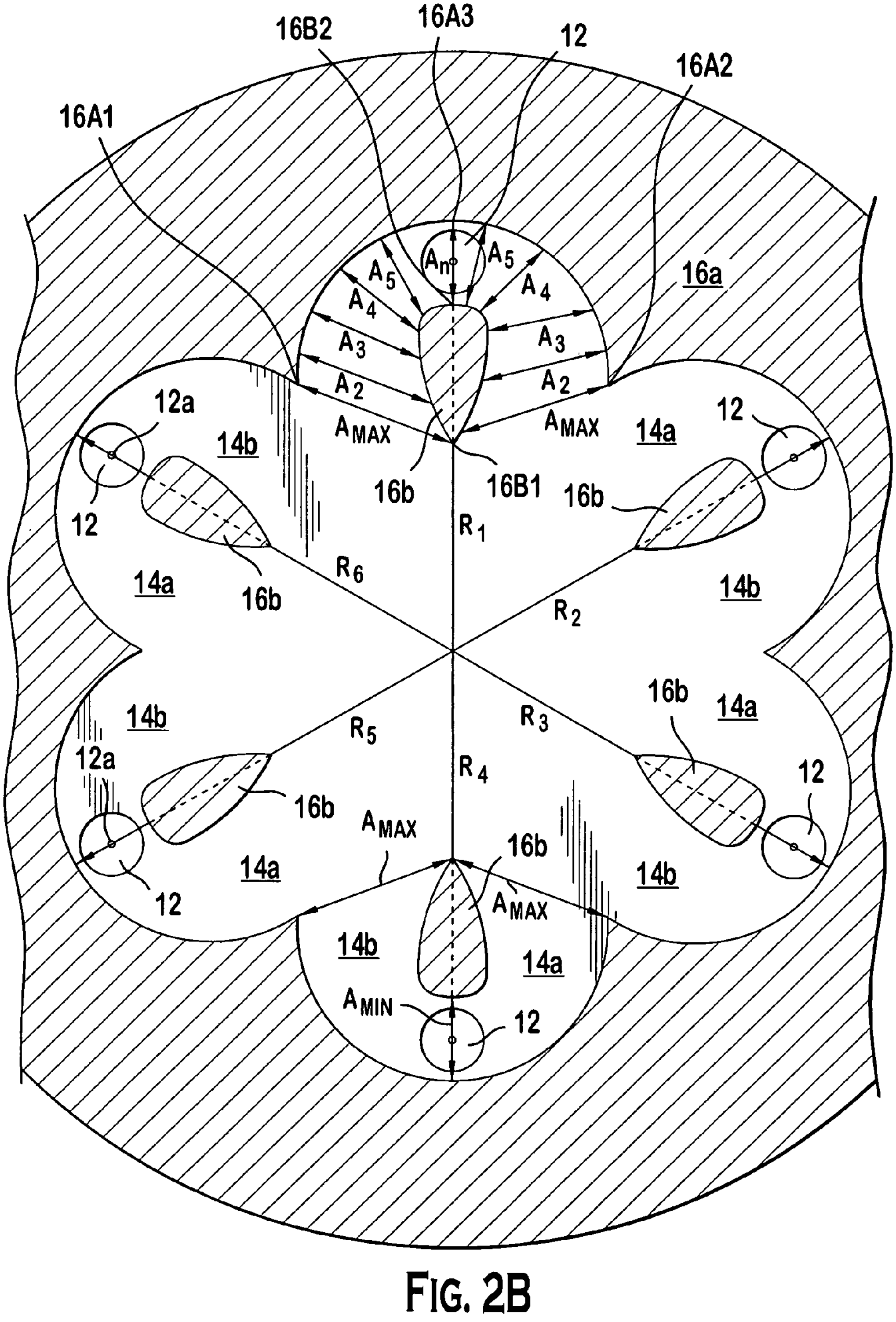
FIG. 2B illustrates a plan view of a metering orifice disc formed from the work piece of FIG. 2A.

In the preferred embodiments, there are several design features that are believed to be advantageous in the metering of fuel when the disc 10 is installed in a suitable fuel injector. In particular, as shown in FIG. 2B, the recessed surface 10*c* are disposed between first and second walls 16*a* and 16*b*. In this preferred configuration, the first wall 16*a* forms a semicircular sector about both the through-opening 12 and the second wall 16*b* . The first wall 16*b* has at least one inner end and preferably two inner ends 16A1 and 16A2 farthest from the center of a through-opening 12 and an outer end 16A3 that is closest to the center of the through-opening 12. The second wall 16*b* is located along an axis R1,R2, R3 . . . Rn extending radially from the longitudinal axis A—A. The second wall has an inner end 16B1 farthest from the center of the through-opening 12 and an outer end 16B2 closest to the center of the through-opening 12. The utilization of the first and second walls 16*a* and 16*b* provides for the two flow channels 14*a* and 14*b* converging towards the through-opening 12. Each flow channel is separated between the first wall 16*a* and second wall 16*b* by a plurality of distances $A_{MAX}$, $A_2$, $A_3$ . . . $A_N$ (where AN is generally equal to the minimum distance $A_{MIN}$) between them. Suffice to note, each flow channel has a maximum inner distance $A_{MAX}$ between the respective farthest points 16A1 and 16B1 (from the center of the through-opening 12) of the walls and a minimum distance $A_{MIN}$ therebetween the closest points 16A3 and 16B2 to the center of the metering orifice. The reduction in the distances $A_{MAX}$ and $A_{MIN}$ is greater than 10 percent. Preferably, the distance $A_{MIN}$ is generally the sum of 50 microns and the maximum linear distance extending across the facing internal wall surfaces of the through-opening 12. This change in the distances between the maximum points and minimum points of the walls reflects a reduction in the flow area of each channel that reaches a constant value proximate the metering orifice or contiguous to the perimeter of the metering orifice. It is believed that the reduction in cross-sectional area of the flow channel induces the flow of fuel from the seat orifice to accelerate towards the metering orifice 12 to thereby induce fuel flowing through the metering orifices 12 to atomize into smaller fuel particle sizes.

In the preferred embodiment of FIGS. 1 and 2B, each through-opening 12 is symmetrically disposed about the longitudinal axis in the preferred embodiment of FIGS. 1 and 2B so that the centerline 12A of each through-opening 12 is generally disposed equiangularly on a virtual bolt circle about the longitudinal axis A—A; each through-opening 12 is a chemically etched orifice having an effective diameter of about 150–200 microns with the overall diameter of the metering disc 10 being a stainless steel disc of about 5.5 millimeters with an overall thickness of about 100–400 microns and a depth between the recessed surface 10*c* and the first surface 10*a* of about 75–300, with preferably 100 microns. In another embodiment, the through-opening 12 has an effective diameter of about 75–150 microns.

Although the metering orifice disc 10 described in FIGS. 1 and 2B is provided with a basic flow channel configuration, other flow channel configurations can also be utilized. For example, as illustrated in FIG. 3A, the flow channels 14*a* and 14*b* are non-symmetrical with respect to each other due to the shape of the first and second walls 16*a* and 16*b*. In the channel configuration of FIG. 3A, a divider wall I has wall surfaces 16B3 and 16B4. The wall surfaces 16B3 and 16B4 define, as viewed in the top view of FIG. 3A, respective first inner chord IC1 and second inner chord IC2 whose lengths are not equal. The first wall portion 16A has preferably two wall surfaces 17A and 17B that define, respectively, first outer chord OC1 and second outer chord OC2, whose lengths are also not equal. Due to the differences in the lengths of the respective inner and outer chords, the first wall 16*a* and second wall 16*b* are not symmetric about any axis extending generally radially from the longitudinal axis A—A.

The asymmetric arrangements of both the first wall 16*a* and second wall 16*b* are believed to be advantageous for the atomization of fuel proximate the outlet of the fuel injector. Specifically, the flow paths F1 and F2 of fuel to the metering orifice 12 via flow channels 14*a* and 14*b* are forced to flow around the first and second walls 16*a* and 16*b* so that when the flow paths F1 and F2 are recombined proximate the metering orifice 12, they are imparted with a spin before the recombined flow of fuel enters the metering orifice 12 and out towards the outlet of the fuel injector. In this configuration I, the effect of the spin to the fuel flow paths F1 and F2 is believed to reduce the amount of direct impact between the flow paths F1 and F2 as they recombine proximate the fuel metering orifice.

As shown in FIG. 3B, the flow channels are generally non-symmetric to each other due to the configuration of the second wall 16*b* . In this configuration II, the outer chords OC1 and OC2 are generally equal but the inner chords IC1 and IC2 are not. However, the difference in the magnitude between the inner chords IC1 and IC2 is not to the extent shown in FIG. 3A. It is believed that even though the difference in chord length is slight in configuration II, the flow paths F1 and F2 of the fuel are still imparted with a spin. It is believed that the effect of the spin, in this embodiment, does not outweigh the atomization effect by impingement of the flow paths F1 and F2 against each other proximate the metering orifice.

Another asymmetric arrangement of the second wall portion 16*b* is illustrated in the divider configuration III, shown here in FIG. 3C. In configuration III, the second wall portion 16*b* is divided into two separate wall portions 16*c* and 16*d* . This arrangement provides for three flow paths: a central flow path Fo and two generally symmetric flow paths F1 and F2.

Each of the flow paths F1 and F2 flow through respective channels 14*a* and 14*b* and has an inlet area delineated by $A_{max2}$ across point 16$a_1$ and 16$b_1$ of respective wall portions 16*c* and 16*d*, The point 16$a_1$ is a portion on the first wall portion 16*a* closest to the longitudinal axis A—A while point 16$b_1$ or 16$b_2$ is a portion on the second wall portion 16*b* farthest from the center 12A of the metering orifice 12. The flow channel 14*a* or 14*b* includes an outlet area to the metering orifice 12 proximate points 16A3 with respect to points 16B3 and 16B4 of wall portions 16*c* and 16*d* to define a distance $A_{MIN2}$. Points 16B3 and 16B4 are portions of the wall 16*c* and 16*d* closest to the center 12A of the metering orifice 12.

The central flow path Fo is formed by flow channel 14C between the wall portions 16*c* and 16*d* with an inlet defined by a distance $A_{MAX3}$ across points 16$b_1$, and 16$b_2$ and an outlet defined by distance $A_{MIN3}$.

It should be noted that a metering orifice disc 10 can use the channel configuration of any one of FIGS. 2B, 3A–3C for all of its metering orifices; a combination of FIGS. 2B, 3A–3C for respective metering orifices; a mix of the channel configuration of FIG. 2B with any one of FIGS. 3A–3C; or a mix of the channel configuration of FIG. 2B with a combination of FIGS. 3A–3C for respective metering orifices.

Figure 4:
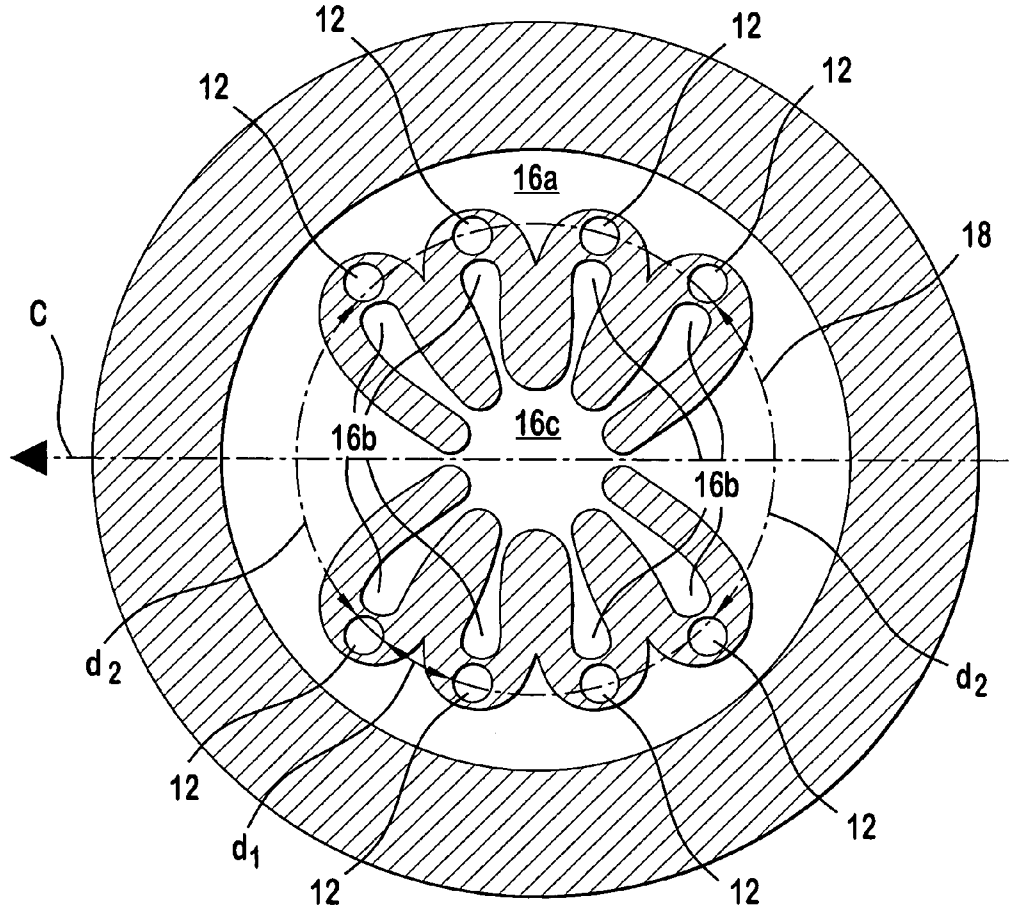
FIG. 4 illustrates another embodiment of the metering orifice disc with eight metering orifices that provide for a split stream fuel spray.

A variation of the metering orifice disc 10 of FIG. 2B is illustrated in FIG. 4. In this embodiment, the metering orifices 12 are disposed on a virtual circle 18 and are symmetric about an axis C transverse to the longitudinal axis A—A so that a fuel spray emanating from the metering orifice disc 10 in an operational fuel injector is bi-symmetric to a plane defined by the longitudinal axis A—A and transverse axis C. In this embodiment, the second walls 16*b* are unitary or monolithically formed by a central wall 16*c* by any one of the techniques described above. Alternatively, the first wall 16*a* , second walls 16*b* and its central portion 16*c* can be cutout from a work piece by stamping through a work piece. Thereafter, the first wall 16*a* can be attached to a conventional metering orifice disc 11 (FIG. 6) by a suitable technique, such as, for example, laser welding. Similarly, the unitary second and third walls 16*b* arid 16*c* can also be attached to the conventional disc 11 to provide for a metering disc with the same configuration as the disc 10 illustrated in FIG. 4.

Figure 5:
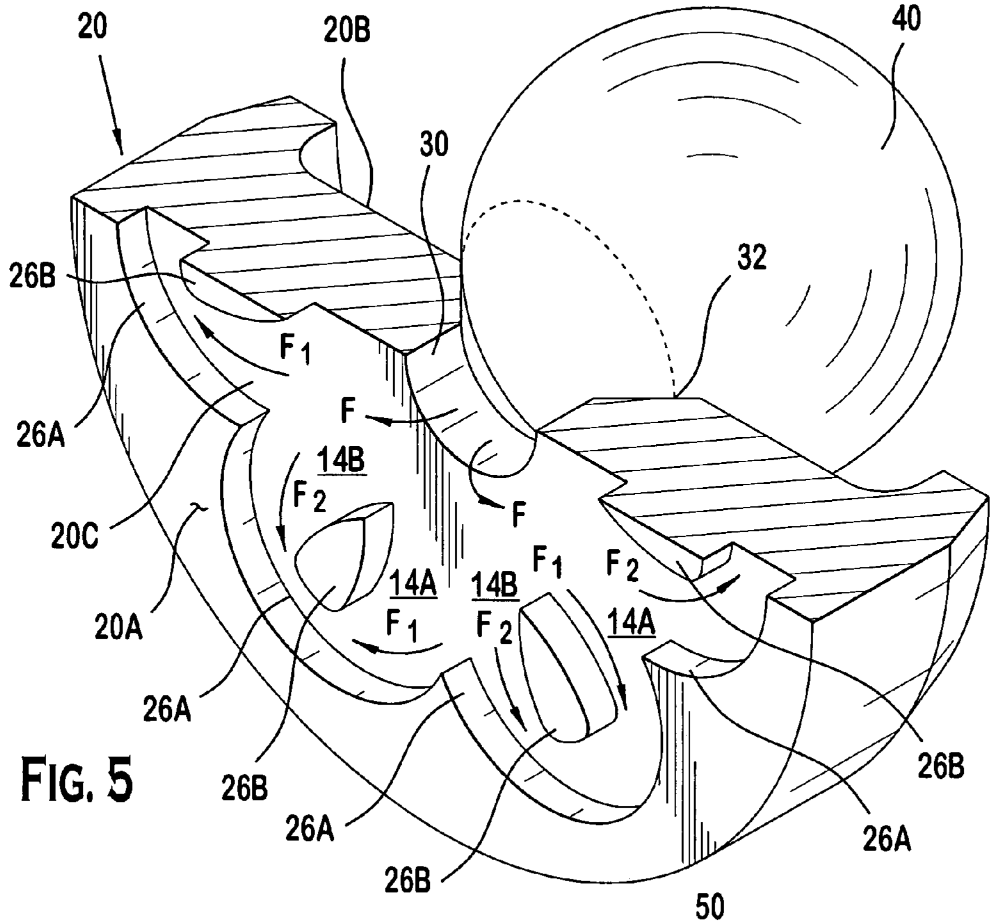
FIG. 5 illustrates the cut-away perspective view of a valve seat formed by the techniques set forth in this application.
Figure 6:
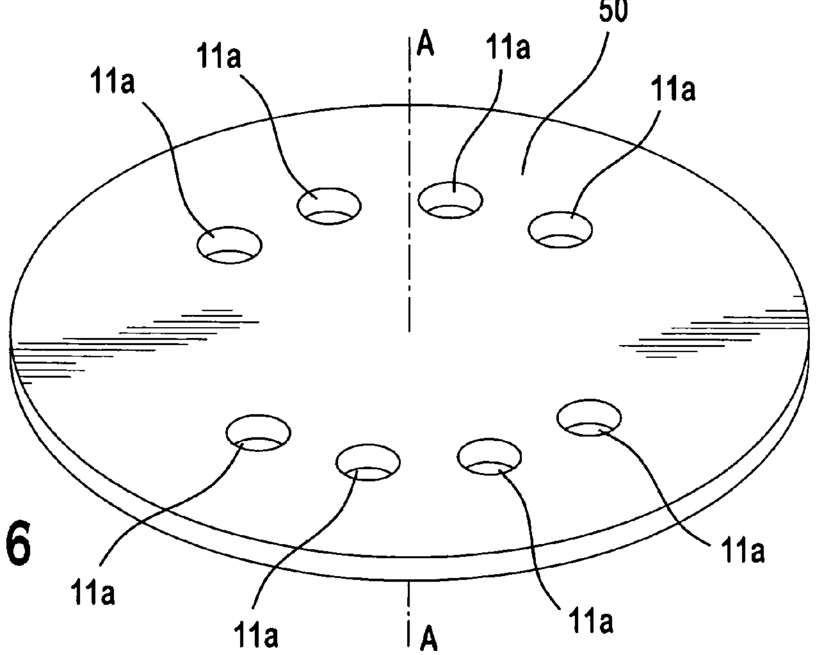
FIG. 6 illustrates a metering orifice disc that can be fixed to the valve seat of FIG. 5.

While FIGS. 1, 2B, 3A–3C and 4 illustrate various embodiments of a metering orifice disc 10, it should be noted that the same techniques and processes described herein could also be used to form flow channels for a fuel injection valve seat. For example, as shown in FIG. 5, a stainless steel valve seat 20 is provided with a seat orifice 30 and sealing surface 32 for contiguous engagement with a closure member 40 of a fuel injector (not shown). The seat 20 has a first surface 20A, second surface 20B and a recessed surface 20C formed by the etching technique described above. In this embodiment, the recessed surface 20C allows for the formation of first wall 26A and second walls 26B with flow channels 14A and 14B to allow fuel flow F to be divided into flow paths F1 and F2 by the second walls 26B. The second walls 26B are preferably teardrop shaped walls but can be any suitable shape as set forth herein in relation to the metering orifice disc 10 and in copending applications Ser. Nos. 10/972,584; 10/972,585; 10/972,864; 10/972,652; and 10/972,651; copending applications are incorporated herein by reference. It is believed that by forming the flow channels in the surface of the seat 20, a standard metering orifice disc 11, shown here in FIG. 6, can be used to achieve the same advantages provided by the preferred metering discs of FIGS. 1, 2B–4 or those set forth in the copending applications noted above.

While FIGS. 1, 2B, 3A–3C and 4 illustrate various embodiments of a metering orifice disc 10, it should be noted that the same techniques and processes described herein could also be used to form flow channels for a fuel injection valve seat. For example, as shown in FIG. 5, a stainless steel valve seat 20 is provided with a seat orifice 30 and sealing surface 32 for contiguous engagement with a closure member 40 of a fuel injector (not shown). The seat 20 has a first surface 20A, second surface 20B and a recessed surface 20C formed by the etching technique described above. In this embodiment, the recessed surface 20C allows for the formation of first wall 26A and second walls 26B with flow channels 14A and 14B to allow fuel flow F to be divided into flow paths F1 and F2 by the second walls 26B. The second walls 26B are preferably teardrop shaped walls but can be any suitable shape as set forth herein in relation to the metering orifice disc 10 and in copending applications Ser. Nos. 10/972,584; 10/972,585; 10/972,864; 10/972,652; and 10/972,651, which copending applications are incorporated herein by reference. It is believed that by forming the flow channels in the surface of the seat 20, a standard metering orifice disc 11, shown here in FIG. 6, can be used to achieve the same advantages provided by the preferred metering discs of FIGS. 1, 2B–4 or those set forth in the copending applications noted above.

Alternatively, two metering orifice discs can be stacked and fixed together with all of the flow channels formed on one disc; part of the flow channels on one disc with the remainder on the other disc. Such stacking arrangement would have a central inlet orifice of about the same opening area as the seat orifice 30 on one disc while the other disc in the stacked arrangement would be provided with metering orifices so that fuel would flow through the central inlet orifice through the channels formed between the stacked discs and out through the metering orifices.

As described, the preferred embodiments, including the techniques of making the metering disc and valve seat are not limited any particular fuel injector but can be used in conjunction with fuel injectors such as, for example, the fuel injector sets forth in U.S. Pat. No. 5,494,225 issued on Feb. 27, 1996, or the modular fuel injectors set forth in U.S. Pat. Nos. 6,676,044 and 6,793,162, and wherein all of these documents are hereby incorporated by reference in their entireties.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A method of making a metering orifice disc from a work piece having a first surface spaced apart from a second surface over a first distance along a longitudinal axis, the metering orifice disc having an outer diameter from 4 to 6 millimeters with at least one orifice disposed through the metering disc of about 75 to 150 microns in effective diameter, the method comprising:

removing material from one of the first and second surfaces of the work piece to define a recessed surface between first and second walls, the recessed surface being located between the first and second surfaces of the work piece; and forming an orifice in the recessed surface proximate a shortest distance between the first and second walls to define two channels that extend towards the longitudinal axis, the orifice extends through the recessed surface to one of the first and second surfaces.

2. The method of claim 1, wherein the removing comprises:

generating a two-dimensional image that defines the recessed surface area on a transfer medium;

applying a photographically resistant masking film onto one of the first and second surfaces;

transferring the image to the photographically resistant masking film disposed on the one surface; and dissolving portions of the work piece having the image of the recessed surface area on the work piece to define the recessed surface between the wall structures.

3. The method of claim 2, wherein the forming of the orifice comprises forming an orifice from the recessed surface to the one of the first and second surfaces.

4. The method of claim 3, wherein the forming comprises electric-discharge-machining the orifice.

5. The method of claim 3, wherein the forming comprises laser machining the orifice.

6. The method of claim 2, wherein the forming comprises:

generating a two-dimensional image of a plurality of orifices disposed about a longitudinal axis on a virtual circle on a transfer medium;

applying a photographically resistant masking film onto the other of the first and second surfaces;

transferring the image to the photographically resistant masking film disposed on the one surface; and dissolving portions of the work piece not protected by the photographically resistant masking film that embodied the image to form a plurality of orifices through the workpiece to the recessed surfaces, each of the plurality of orifices including a center defined by the internal wall surface of the orifice.

7. The method of claim 6, wherein the first wall comprises an outer wall having a first outer wall portion closest to the longitudinal axis and a second outer wall portion closest to the center of the metering orifice; and the second wall comprises an inner wall having first and second inner wall portions, each of the first and second inner wall portions including a first portion furthest from the center of the metering orifice and a second portion closest to the center of the metering orifice, each of the first and second inner walls confronting the outer wall to define a channel that extends towards the metering orifice, the channel has a first distance between the first outer wall portion and the first portion being greater than a second distance between the second outer wall portion and second portion, the first and second inner wall portions being spaced apart between respective first portions to define a third distance greater than a fourth distance between respective second portions, and wherein the recessed surface, inner and outer walls define three flow channels for each metering orifice, one of the three flow channels comprises a convergent linear flow channel and the other of the three flow channels comprises curved flow channels.

8. The method of claim 1, wherein the first wall comprises a first inner wall portion closest to the longitudinal axis and a first outer wall portion closest to the center of the orifice, and the second wall having a second inner wall portion furthest from the center of the orifice and a second outer wall portion closest to the center of the orifice, the second wall confronting the first wall to define a channel across the recessed surface that has a first distance between the first inner wall portion and second inner wall portion being greater than a second distance between the first outer wall portion and second outer wall portion.

9. The method of claim 1, wherein the first wall comprises an outer wall having a surface that defines first and second outer chords generally about the longitudinal axis, the first outer chord intersecting the second chord and having a length different than the length of the second outer chord; and the second wall comprises an inner wall having a surface that defines first and second inner chords that extend generally transverse to the longitudinal axis, the first inner chord intersecting the second inner chord, the first inner chord having a length different than the length of the second inner chord.

10. The method according to claim 9, wherein the first wall includes a first inner wall portion closest to the longitudinal axis and a first outer wall portion closest to the center of the metering orifice, the second wall having a second inner wall portion furthest from the center of the metering orifice and a second outer wall portion closest to the center of the metering orifice, the second wall confronting the first wall to define a channel that extends towards the metering orifice, the channel has a first distance between the first inner wall portion and second inner wall portion being greater than a second distance between the first outer wall portion and second outer wall portion.

11. A method of making a valve seat from a work piece having a first surface spaced apart from a second surface over a first distance, the method comprising:

providing a seat orifice extending through the work piece from the first surface along a longitudinal axis extending through the seat orifice to the second surface of the work piece; and removing material on the second surface of the work piece to define at least two flow channels extending generally transversely with respect to the longitudinal axis between first and second walls, wherein the removing comprises:

generating a two-dimensional image that defines recessed surfaces on a transfer medium;

applying a photographically resistant masking film onto one of the first and second surfaces;

transferring the image to the photographically resistant masking film disposed on the one surface; and dissolving portions of the work piece not protected by the photographically resistant masking film that embodied the image to define the recessed surface located between the first and second walls.

12. A method of making a valve seat from a work piece having a first surface spaced apart from a second surface over a first distance, the method comprising:

providing a seat orifice extending through the work piece from the first surface along a longitudinal axis extending through the seat orifice to the second surface of the work piece; and removing material on the second surface of the work piece to define at least two flow channels extending generally transversely with respect to the longitudinal axis between first and second walls, wherein the first wall comprises an outer wall having a surface that defines first and second outer chords generally about the longitudinal axis, the first outer chord intersecting the second chord and having a length different than the length of the second outer chord; and the second wall comprises an inner wall having a surface that defines first and second inner chords that extend generally transverse to the longitudinal axis, the first inner chord intersecting the second inner chord, the first inner chord having a length different than the length of the second inner chord.

13. A method of making a valve seat from a work piece having a first surface spaced apart from a second surface over a first distance, the method comprising:

providing a seat orifice extending through the work piece from the first surface along a longitudinal axis extending through the seat orifice to the second surface of the work piece; and removing material on the second surface of the work piece to define at least two flow channels extending generally transversely with respect to the longitudinal axis between first and second walls, wherein the first wall comprises an outer wall having a surface that defines first and second outer chords generally about the longitudinal axis, the first outer chord intersecting the second chord and having a length generally equal to the length of the second outer chord; and the second wall comprises an inner wall having a surface that defines first and second inner chords that extend generally transverse to the longitudinal axis, the first inner chord intersecting the second inner chord, the first inner chord having a length generally equal to the length of the second inner chord.

* * * * *